United States Patent
Kobayashi et al.

(10) Patent No.: US 11,878,649 B2
(45) Date of Patent: Jan. 23, 2024

(54) AIRBAG DEVICE AND METHOD FOR MANUFACTURING SAME

(71) Applicant: Autoliv Development AB, Vargarda (SE)

(72) Inventors: Yuto Kobayashi, Kanagawa (JP); Tsutomu Sakurai, Kanagawa (JP); Hideho Fukuda, Kanagawa (JP)

(*) Notice: Subject to any disclaimer, the term of this patent is extended or adjusted under 35 U.S.C. 154(b) by 0 days.

(21) Appl. No.: 17/905,391

(22) PCT Filed: Jan. 27, 2021

(86) PCT No.: PCT/JP2021/002804
§ 371 (c)(1),
(2) Date: Aug. 31, 2022

(87) PCT Pub. No.: WO2021/176896
PCT Pub. Date: Sep. 10, 2021

(65) Prior Publication Data
US 2023/0130463 A1 Apr. 27, 2023

(30) Foreign Application Priority Data

Mar. 5, 2020 (JP) ................................ 2020-037827

(51) Int. Cl.
*B60R 21/201* (2011.01)
*B60R 21/215* (2011.01)
(Continued)

(52) U.S. Cl.
CPC .......... *B60R 21/237* (2013.01); *B60R 21/201* (2013.01); *B60R 21/207* (2013.01);
(Continued)

(58) Field of Classification Search
CPC ... B60R 21/201; B60R 21/215; B60R 21/237; B60R 21/207; B60R 21/2176;
(Continued)

(56) References Cited

U.S. PATENT DOCUMENTS

2023/0192022 A1* 6/2023 Kobayashi .......... B60R 21/2165
280/728.1

FOREIGN PATENT DOCUMENTS

| CN | 203063891 U | 7/2013 |
|---|---|---|
| DE | 102011106749 A1 * | 1/2013 |

(Continued)

OTHER PUBLICATIONS

Office Action received in corresponding Chinese application No. 202180017115.x, dated Apr. 14, 2023 with translation.

*Primary Examiner* — Keith J Frisby
(74) *Attorney, Agent, or Firm* — Harness, Dickey & Pierce, P.L.C.; Stephen T. Olson (57) ABSTRACT

An improved modularization of an airbag cushion covered with a cover member and a method for manufacturing the same are disclosed. A first press is performed on the first portion of the cover member in a state where the folded airbag cushion 30 is not covered with the cover member. The first portion has at least a portion that includes a position corresponding to an inflator within the folded airbag cushion. Next, the folded airbag cushion is covered with the cover member, and in the covered state, a second press is applied to at least a part of the second portion of the cover member excluding the first portion.

14 Claims, 9 Drawing Sheets

(51) Int. Cl.
*B60R 21/217* (2011.01)
*B60R 21/207* (2006.01)
*B60R 21/237* (2006.01)
*B60R 21/231* (2011.01)

(52) U.S. Cl.
CPC ........ *B60R 21/215* (2013.01); *B60R 21/2176* (2013.01); *B60R 2021/23146* (2013.01)

(58) Field of Classification Search
CPC ............ B60R 21/23138; B60R 21/217; B60R 2021/23146
USPC .......................................... 280/730.2, 728.1
See application file for complete search history.

(56) References Cited

FOREIGN PATENT DOCUMENTS

| | | |
|---|---|---|
| DE | 102011106749 A1 | 1/2013 |
| JP | 2002-211338 A | 7/2002 |
| JP | 2019-523172 A | 8/2019 |
| JP | 2019523172 A | 8/2019 |
| WO | 2016/169854 A1 | 10/2016 |
| WO | 2016169854 A1 | 10/2016 |
| WO | 2018/154979 A1 | 8/2018 |
| WO | 2018154979 A1 | 8/2018 |

\* cited by examiner

Portion 200 where the second press was performed

FIG. 7E

Portion 200 where the second press was performed

FIG. 7F

Portion 200 where the second press was performed

FIG. 7G

AIRBAG DEVICE AND METHOD FOR MANUFACTURING SAME

TECHNICAL FIELD

The present invention relates to an airbag device and a manufacturing method thereof.

BACKGROUND ART

For example, patent Document 1 discloses a side collision airbag device. In this airbag device, when folding the airbag, the inflator is stowed in the base end portion of the airbag so as to surround the inflator. Furthermore, modularization is achieved by stowing an airbag with an inflator and a deployment guide cloth that guides deployment in a module case integrally molded with synthetic resin, and the airbag module is arranged inside the side surface of the seat back.

PRIOR ART DOCUMENTS

Patent Documents

[Patent Document 1] Japanese Unexamined Patent Application 2002-211338

SUMMARY OF THE INVENTION

Problem to be Solved by the Invention

Methods of using a 3D compress as a technique when performing modularization are also known. In this case, by covering the airbag cushion with a cover member such as a felt material, and pressing the felt material using a mold while heating the felt material, the airbag module can be compressed to a prescribed three-dimensional shape and size.

However, simply pressing may damage the inflator in the airbag cushion. On the other hand, if only a portion of the airbag cushion that avoids the inflator is pressed, the hardness of the portion of the cover member near the inflator that is not pressed may not be improved. On the other hand, if the entire cover member is pre-pressed, the entire airbag module cannot be compressed to a prescribed three-dimensional shape and size.

An object of the present invention is to provide an airbag device with improved modularization, in which an airbag cushion is covered with a cover member, and a method of manufacturing the same.

Means to Solve the Problem

A manufacturing method of an airbag device according to a first aspect of the present invention containing a folded airbag cushion with at least a part of an inflator equipped therein, and a cover member covering the folded airbag cushion, includes:
performing a first press in a state where the folded airbag cushion is not covered by the cover member on a first portion of the cover member where the first portion includes a portion included in a position corresponding to the inflator within the folded airbag cushion (hereinafter may be called "inflator corresponding portion");
covering the folded airbag cushion with the cover member; and
performing a second press in a state where the folded airbag cushion is covered by the cover member on at least a part of a portion of the cover member where the first press was not performed (hereinafter this portion may be called "first non-pressed portion").

According to this aspect, with regards to the cover member, the first press is performed on the first portion having the inflator corresponding portion, and then the portion including at least part of the first non-pressed portion is subjected to the second press. Since the cover member is not covering the airbag cushion during the first press, affecting the inflator can be prevented. As a result, the properties of the first portion of the cover member including the inflator corresponding portion can be changed (for example, increased hardness and changed surface properties) by pressing. Further, during the second press, since the cover member covers the airbag cushion, a portion including at least a part of the first non-pressed portion of the cover member can be subjected to a change in properties (for example, an increase in hardness or change in surface properties), while compressing the entirety thereof into, for example, a prescribed three-dimensional shape and size. In this manner, since the pressing is performed in at least two stages with consideration for the position of the inflator, it is possible to modularize the cover member to suppress or avoid affecting the inflator, and pressing can be performed to widely change the properties of the cover member.

In some Embodiments, the portion subjected to the second press may have different surface properties than the portion subjected to only the first press of the first and second presses. For example, the former portion should have a larger surface roughness value than the latter portion.

In some Embodiments, the portion on which the second press is performed may include all of the first non-pressed portion. In other words, the second press may be performed on all remaining portions of the cover member excluding the first portion.

In some other Embodiments, the portion on which the second press is performed may include a portion of the first non-pressed portion. In other words, the second press may be performed on a part of the remaining portion of the cover member excluding the first portion. In this case, for example, there may be a portion where neither the first press nor the second press is performed between the portion where the second press is performed and the portion where the first press is performed.

In some other Embodiments, the portion to which the second press was performed may include all or part of the first non-pressed portion and a part of the first portion connected to the first non-pressed portion. In other words, the second press may be performed on the first non-pressed portion including part of the first portion (the boundary between the first portion and the first non-pressed portion). In this case, part of the first portion is a portion subjected to both the first press and the second press. The part where both of these presses are performed should not include the inflator corresponding portion.

The airbag device according to one aspect of the present invention includes:
a folded airbag cushion with at least a part of an inflator equipped therein, and a cover member covering the folded airbag cushion, wherein
the cover member has a portion including a position corresponding to the inflator within the folded airbag cushion (hereinafter referred to as the inflator corresponding portion in this paragraph),
the cover member has a first portion and second portion of which surface properties are mutually different, and out of the first portion and second portion, all or most of the portion of the inflator corresponding portion is included in the first portion.

The airbag device according to another aspect of the present invention is an airbag device, including:
a folded airbag cushion equipped with at least a part of an inflator, and
a cover member covering the folded airbag cushion, wherein
the cover member has a portion including a position corresponding to the inflator within the folded airbag cushion (hereinafter referred to as the inflator corresponding portion in this paragraph),
the cover member has a first portion and second portion of which surface properties are mutually different,
all or most of the portion of the inflator corresponding portion is included in the first portion out of the first portion and second portion,
the first portion is a portion of the cover member to which the first press was performed before the cover member covers the folded airbag cushion, and
the second portion has a portion to which the second press was performed to a portion including at least a part of the portion of the cover member to which the first press was not performed in a state of the cover member covering the folded airbag cushion.

DESCRIPTION OF THE PREFERRED EMBODIMENTS

The airbag device according to the preferred Embodiments of the present invention will be described with reference to the accompanying drawings.

Figure 1:
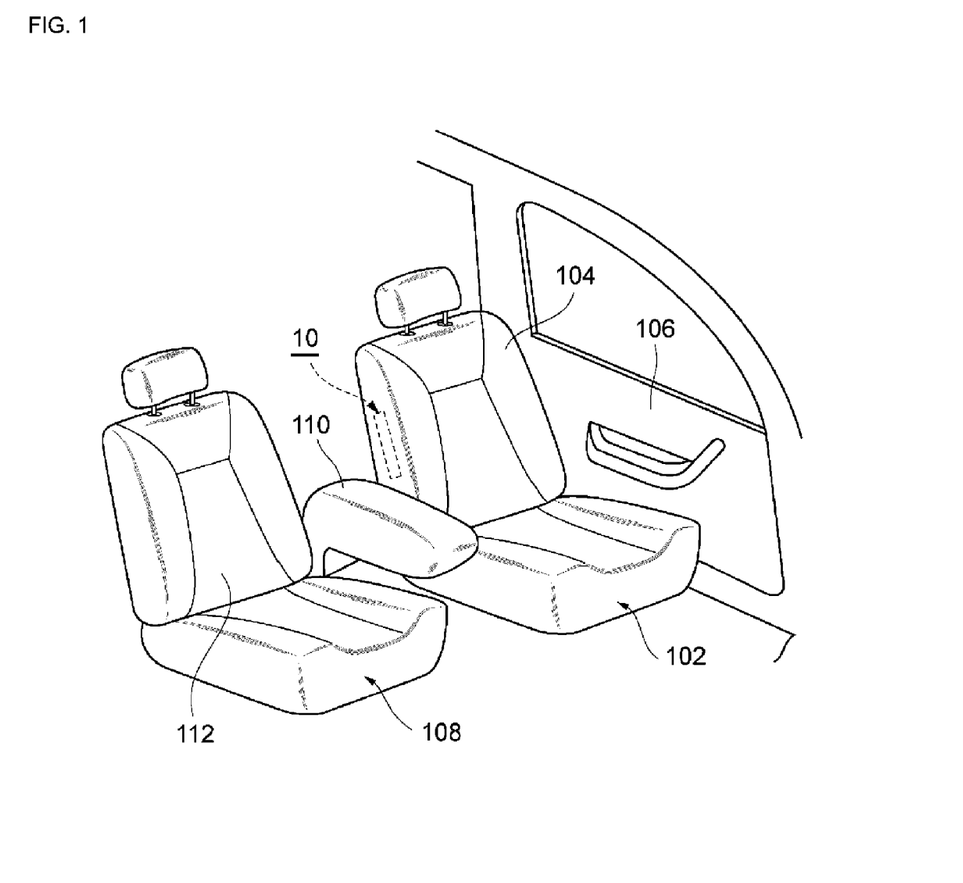
FIG. 1 is a perspective view of a vehicle seat on which an airbag device according to the Embodiment is arranged.

As illustrated in FIG. 1, the airbag device 10 is configured, for example, as a side airbag device, and is provided inside the side surface of a seat back 104 of a vehicle seat 102 on the vehicle center side, as indicated by the dotted line in the drawing. The vehicle seat 102 is the left front seat (for example, passenger seat) in the vehicle. A side door 106 is positioned on the vehicle outer side of the vehicle seat 102, and a vehicle seat 108, which is a right front seat (for example, a driver seat), is arranged on the vehicle center side. A center console 110 is arranged between the vehicle seats 102 and 108.

In other Embodiments, the airbag device 10 can be provided on either the vehicle outer side of the seat back 104, or the vehicle center side or vehicle outer side of the seat back 112 of the vehicle seat 108. In addition, the vehicle seat on which the airbag device 10 is provided is not limited to the front seat, and may be the rear seat.

Figure 2:
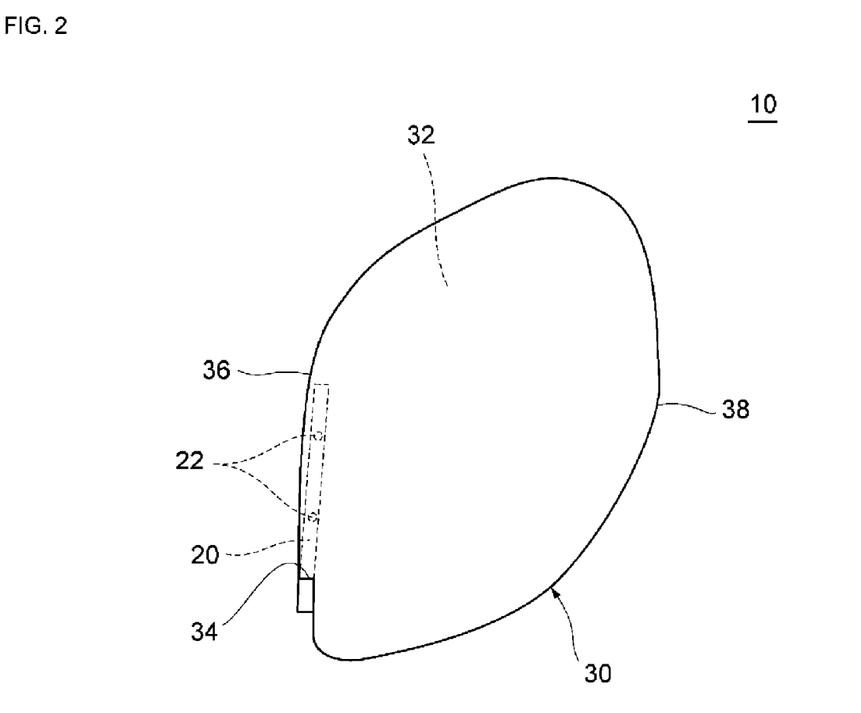
FIG. 2 is a plan view illustrating an unfolded airbag cushion with an inflator according to the Embodiment, omitting a cover member of the airbag device.
Figure 3:
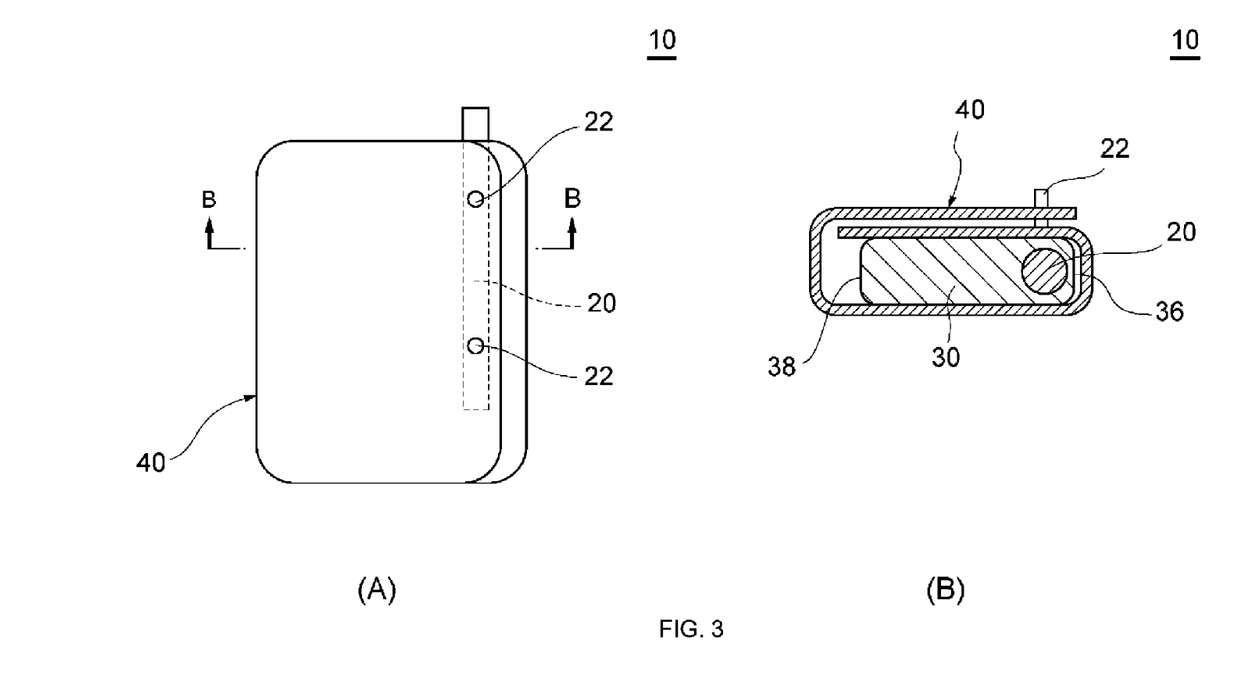
FIG. 3 is related to the airbag device according to the Embodiment, where (A) is a plan view and (B) is a schematic cross-sectional view taken along line B-B.

As illustrated in FIGS. 2 and 3, the airbag device 10 includes an inflator 20, an airbag cushion 30 and a cover member 40.

The inflator 20 supplies gas for expansion and deployment inside the airbag cushion 30 in the event of a vehicle emergency. The inflator 20 is electrically connected to, for example, a vehicle-side ECU, and operates upon receiving a signal from the vehicle-side ECU indicating that a vehicle emergency situation has been detected. Various inflators can be used as the inflator 20, such as those filled with a gas generating agent, compressed gas, or both.

For example, the inflator 20 has a bottomed cylinder filled with a gas generating agent and an ignition device provided at the open end of the cylinder. The cylindrical body is provided with a plurality of (here, two) stud bolts 22 (securing portions) spaced apart in the axial direction of the cylindrical body, and the airbag device 10 is secured to the vehicle seat via these stud bolts 22. Moreover, a plurality of ejection holes are formed in the peripheral surface of the cylindrical body. By igniting the gas generating agent in the cylindrical body with the ignition device, gas is generated and the gas for expansion and deployment is supplied into the airbag cushion 30 from a plurality of ejection holes.

The airbag cushion 30 is formed into a bag shape by, for example, a method of sewing or adhering one or a plurality of these base fabrics or the like at appropriate positions, or a method of weaving using OPW (One-Piece Woven). The airbag cushion 30 is folded and is inflated and deployed on the side of the vehicle seat by being supplied with the expansion and deployment gas. The folded airbag cushion 30 has, for example, a roll shape, an accordion shape, or a combination thereof.

The airbag cushion 30 incorporates a part or all of the inflator 20. For example, the airbag cushion 30 has an opening 34 for inserting the majority of the inflator 20 into the interior expandable capacity 32 thereof. The opening 34 is formed, for example, in the vicinity of one side part 36 of the opposing side parts 36 and 38 of the airbag cushion 30. The remaining portion of the inflator 20 protrudes outward from the airbag cushion 30 through the opening 34, for example, to facilitate electrical connection with a vehicle-side ECU. In addition, stud bolts 22 of the inflator 20 protrude outside the airbag cushion 30 through openings formed in one of the front and back fabrics of the airbag cushion 30.

As illustrated in FIG. 3, the cover member 40 covers the folded airbag cushion 30. For example, the cover member 40 is wrapped around the entire circumference of the folded airbag cushion 30. The cover member 40 may be provided with a weakened portion in advance by perforations, slits, grooves, or the like. The weak portion is torn by the airbag cushion 30 when the airbag cushion 30 is deployed, so that the airbag cushion 30 can easily eject from the cover member 40.

The cover member 40 can be formed with a variety of materials, here the member is formed out of a ductile material. Specifically, the material of the cover member 40 may take the form of a non-woven fabric including a plurality of poly fibers that are ductile fabric materials. Non-woven fabrics, including felt-like fabrics, can be used. Polyester felt produced by the known needle method in which polyester fibers are entangled by needle processing and fixed to each other is an example. Polyester fibers can be provided as polyethylene terephthalate (PET), wherein the felt materials may be made of 100% PET. Fibers configuring felt materials are randomly or pseudo-randomly entangled. Moreover, the felt may include two kinds of fibers of different configurations. Moreover, all monocomponent composite fibers configuring the felt can be formed of PET homo-polymers, wherein bicomponent composite fiber having a core and shell surrounding the core can be used. The core and shell of the bicomponent composite fibers are configured to have different properties, specifically different melting points, such that the shell has a significantly lower melting point than the core (for example, in the range of 120 to 150° C.). Bicomponent composite fibers can also be formed entirely of PET, but the core can be molded of PET homopolymers and the shell can be formed of PET copolymers (coPET). When such a PET and coPET are combined, while the melting point of the shell is lower than the melting point of the cores, overall, the fibers can be assuredly formed of PET. Both the core of the bicomponent composite fibers and the monocomponent fibers are formed of PET homopolymers and therefore have the same melting point, with the monocomponent fibers having a melting point higher than the shell of the two component composite fibers. The bicomponent composite fibers are equally distributed to the overall monocomponent fibers in felt materials. The bicomponent composite fibers can account for 30% to 60% of all fibers of felt materials, while all the remaining fibers can be monocomponent fibers. The materials used for the single-component fibers and the bicomponent composite fibers may partially contain the above-described fibers as long as the fibers can be effectively fused together.

Figure 6:
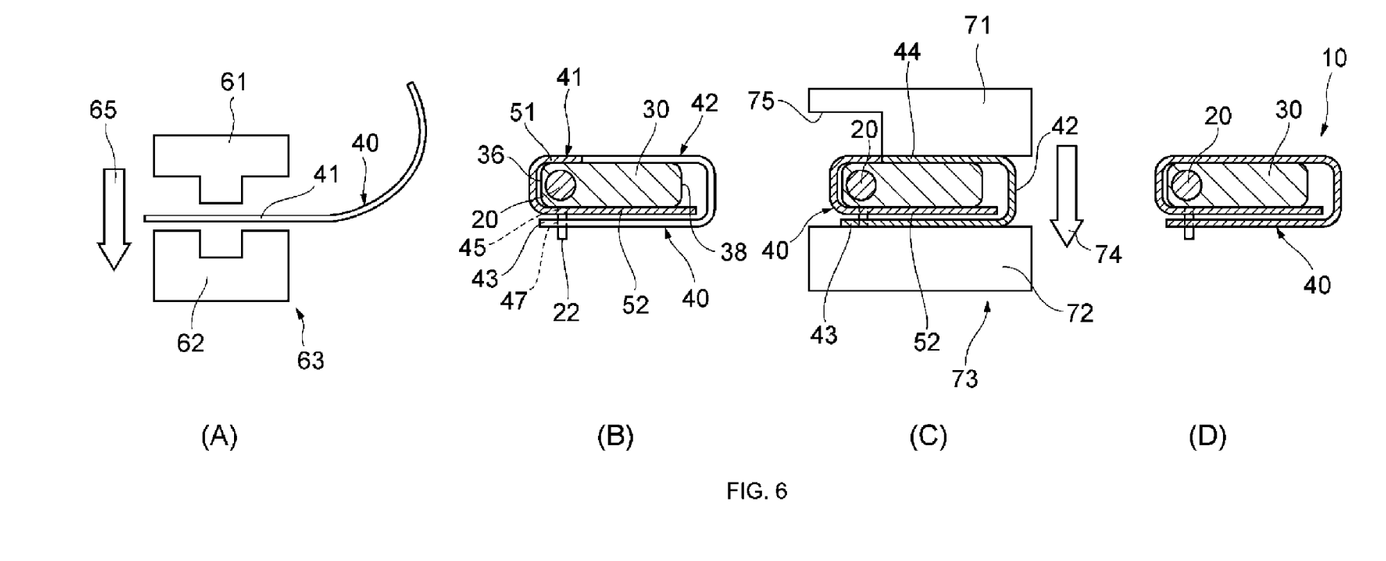
FIG. 6 is a schematic diagram illustrating the flow of the manufacturing method of the airbag device according to the Embodiment.

When manufacturing the airbag device 10, the cover member 40 is pressed by a pressing device (see: press devices 63 and 73 in FIG. 6). The pressing device plastically deforms the cover member 40 and changes the properties of the cover member 40. The press device, for example, applies pressure to the cover member 40 while applying heat to the cover member 40. The heat applied by the press is at a temperature above the melting point of the bicomponent composite fiber coating in the cover member 40 but below the melting points of the bicomponent composite fiber core and the monocomponent fibers. This causes the coating of the cover member 40 to dissolve and the shell to fuse together at all positions where the fibers are distributed on the cover member 40. On the other hand, the core and monocomponent fibers of the cover member 40 remain in solid phase and are not fused together. At the portion where the shell of the cover member 40 are fused together, the surface properties of the cover member 40 change and the hardness increases.

Pressing on the cover member 40 is performed in a plurality of stages (two stages in this case), as will be described later in relation to FIG. 6. In this case, a first press is performed only on the cover member 40. A second press is performed in a state in which the airbag cushion 30 with the inflator 20 is covered with the cover member 40 (intermediate package state). Manufacturing of the final modularized airbag device 10 includes the second press where the intermediate package is compressed into a prescribed three-dimensional shape and size. In the manufactured airbag device 10, the cover member 40 protects the folded airbag cushion 30 so that the folded airbag cushion 30 does not deform or unravel.

Figure 4:
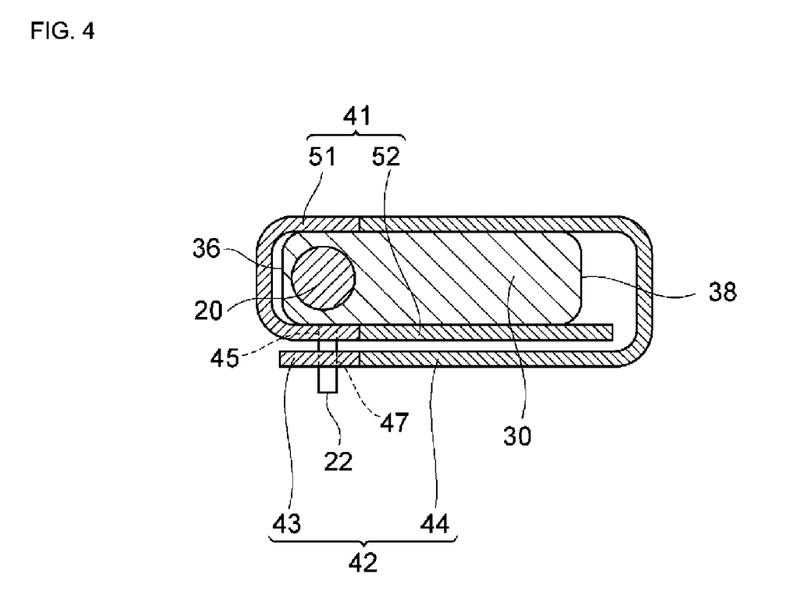
FIG. 4 is a schematic cross-sectional view illustrating the cover member of the airbag device according to the Embodiment divided into areas according to surface properties.

As illustrated in FIG. 4, the cover member 40 mainly includes a first portion 41 and a second portion 42 having different surface properties. The different surface properties are due to what is subject to being pressed when the pressing is performed in a plurality of stages is different. Here, the first portion 41 is the portion on which the first press is or has been performed. The second portion 42 includes a portion where a second press is or has been performed. The area of the airbag cushion 30 covered by the second portion 42 is larger than the area of the airbag cushion 30 covered by the first portion 41.

In the following description, the portion of the cover member 40 that has not been pressed for the first time will be referred to as a "first non-pressed portion". In the example illustrated in FIG. 4, the first non-pressed portion consists of the second portion 42.

In relation to the inflator 20, the first portion 41 has a portion that includes the position corresponding to the inflator 20 within the folded airbag cushion 30 (hereinafter referred to as the IF-corresponding portion 51) and the first connecting portion 52 connected to the IF-corresponding portion 51. The IF-corresponding portion 51 extends between the first connecting portion 52 and the second portion 42, and ends with a substantially C-shaped cross section that wraps around and covers the side part 36 of the folded airbag cushion 30. Specifically, the IF-corresponding portion 51 has upper portion and lower portion positions above and below the inflator 20 via the airbag cushion 30, and a side part that connects the upper and lower portions positioned on the side of the inflator 20 via the side part 36 of the airbag cushion 30. Holes 45 for inserting the stud bolts 22 extending to the outside of the folded airbag cushion 30 are formed in the lower portion of the IF-corresponding portion 51. The first connecting portion 52 is a portion including a first end of the cover member 40 and extends away from the position corresponding to the inflator 20. As will be described later, the first connecting portion 52 overlaps the inside of the second portion 42 during the second press.

The second portion 42 has a non-IF corresponding portion 44 connected to the IF-corresponding portion 51 and a second connecting portion 43 connecting to the non-IF corresponding portion 44. The non-IF corresponding portion 44 is a portion that does not include a position within the folded airbag cushion 30 that corresponds to the inflator 20. The second portion 42 ends with a portion having a substantially C-shaped cross section that wraps around and covers the side part 38 of the folded airbag cushion 30. In this case, the non-IF corresponding portion 44 of the second portion 42 has an upper portion and lower portion that cover the upper and lower portions of the airbag cushion 30 in the positions absent the inflator 20, and a side portion that covers the side part 38 of the airbag cushion 30 connected to these upper and lower portions.

The side part 38 covered by the non-IF corresponding portion 44 is the side part of the airbag cushion 30 positioned opposite to the side part 36 when the airbag cushion 30 is folded. Note that the side parts may include the side part 38 illustrated in FIG. 2, but may not include the side part 38 illustrated in FIG. 2 depending on how the airbag cushion 30 is folded.

The second connecting portion 43 is a portion including a second end of the cover member 40. As will be described later, the second connecting portion 43 overlaps the first portion 41 during the second press. Specifically, the second connecting portion 43 overlaps the lower portion of the IF-corresponding portion 51 of the first portion 41 from the outside during the second press. Holes 47 for inserting the stud bolts 22 are formed in the second connecting portion 43. Note that the cover member 40 may also not have the second connecting portion 43. Thus, for example, the second portion 42 may consist of the non-IF corresponding portion 44.

Next, a method of manufacturing the airbag device 10 will be described with reference to FIGS. 5 and 6.

Figure 5:
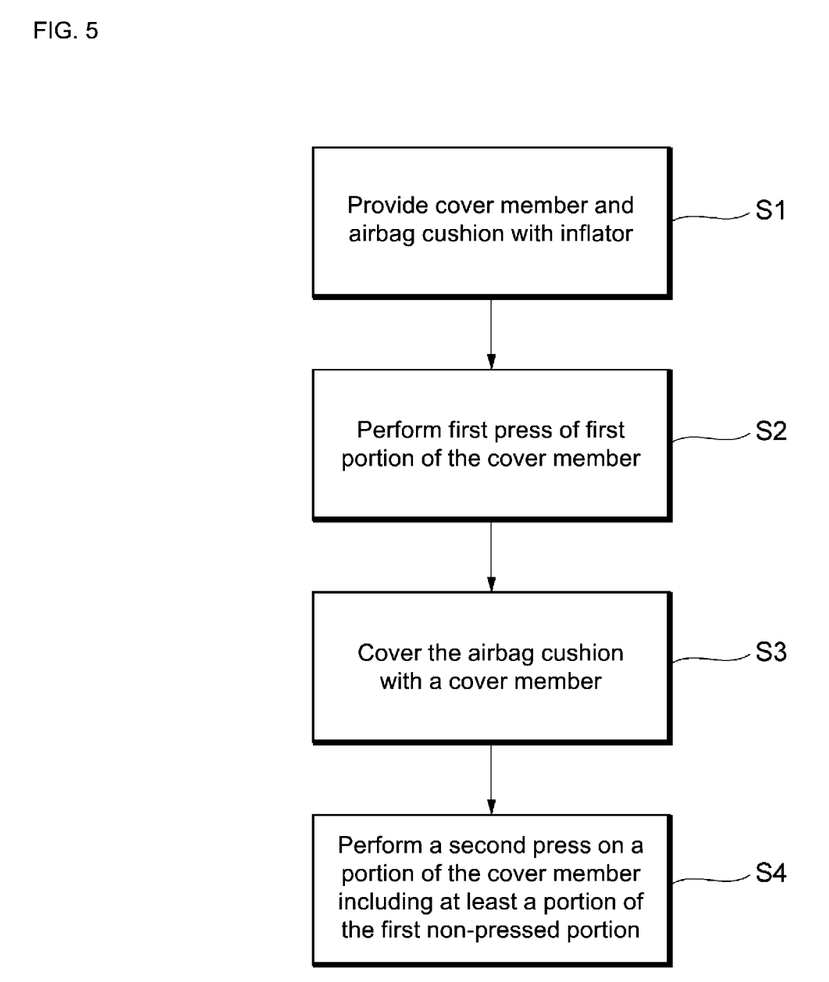
FIG. 5 is a flowchart illustrating the manufacturing method of the airbag device according to the Embodiment.

First, in order to manufacture the airbag device 10, the cover member 40 and the airbag cushion 30 with the inflator 20 are provided (FIG. 5: step S1). The airbag cushion 30 with the inflator 20 is obtained by winding the airbag cushion 30 toward the inflator 20 and then folding.

Next, a first press is applied to the first portion 41 of the cover member 40 (FIG. 5: step S2, FIG. 6(A)). The first portion 41 has the IF-corresponding portion 51 and the first connecting portion 52 as described above. The first press uses a press device 63 having molds 61 and 62 to press the first portion 41 as indicated by an arrow 65 in the diagram. The first press is performed with the folded airbag cushion 30 not covered with the cover member 40. The first press is performed by applying pressure to the cover member 40 while applying heat to the cover member 40. Heating of the cover member 40 is performed by heating the molds 61 and 62, for example. The first press causes the above-described fusion of the fibers in the first portion 41 and changes the properties of the first portion 41 (increase in hardness, change in surface properties).

Next, the folded airbag cushion 30 is covered with the cover member 40 (FIG. 5: step S3, FIG. 6(B)). Here, the IF-corresponding portion 51 of the first portion 41 of the cover member 40 wraps around and covers the side part 36 of the folded airbag cushion 30, and the second portion 42 of the cover member 40 wraps around and covers the side part 38 of the folded airbag cushion 30. In addition, the lower portion of the non-IF corresponding portion 44 of the second part 42 is overlapped on the outside of the first connecting portion 52 of the first portion 41, and the second connecting portion 43 of the second portion 42 is overlapped with the lower portion of the IF-corresponding portion 51 of the first portion 41. Furthermore, the hole 45 of the first portion 41 and the hole 47 of the second connecting portion 43 are aligned, and the stud bolt 22 of the inflator 20 protrudes outward from the holes 45 and 47, respectively. This is then assembled into an intermediate package.

Next, a second press is performed to a portion of the cover member 40 that includes at least a part of the first non-pressed portion (FIG. 5: step S4, FIG. 6(C)). The second press is performed with the cover member 40 covering the folded airbag cushion 30. The second press uses a press device 73 having molds 71 and 72 to press the non-IF corresponding portion 44 of the second portion 42 as indicated by an arrow 74 in the diagram. The press device 73 is provided with a recess 75 for inflator clearance in the mold 71 so as not to press the entire intermediate package, specifically, to not press the position corresponding to the inflator 20. When performing the second press, the first connecting portion 52 of the first portion 41 overlaps the inside of the non-IF corresponding portion 44 of the second portion 42 and does not come into direct contact with the mold 72. The second press is performed by applying pressure to the non-IF corresponding portion 44 of the cover member 40 while applying heat to the cover member 40. Heating of the cover member 40 is performed by heating the molds 71 and 72, for example. The second press causes the above-described fusion of the fibers in the non-IF corresponding portion 44 of the second portion 42, and changes the properties of the second portion 42 (increase in hardness, change in surface properties). A second press is thus performed to compress the intermediate package into a pre-scribed three-dimensional shape and size. This completes manufacturing of the final modularized airbag device 10 (see FIG. 6(D)).

Here, during the second press, the second connecting portion 43 is in direct contact with the mold 72 together with the lower portion of the second portion 42. Therefore, during the second press, the second connecting portion 43 receives heat transfer from the heated mold 72. As a result, the felt of the second connecting portion 43 undergoes a thermosetting cycle (from dissolution by heat to rehardening), so that the felt hardens. In other words, in the same way as in the non-IF corresponding portion 44, the above-described fusion of the fibers occurs in the second connecting portion 43, causing a change in the properties of the second connecting portion 43 (increase in hardness, change in surface properties). However, the second connecting portion 43 does not receive pressure from the pressing device 73 due to its relationship with the recess 75 of the mold 71.

In the manufactured airbag device 10, each portion of the cover member 40 has different surface properties. For example, the first portion 41 and the non-IF corresponding portion 44 of the second portion 42 have relatively different surface properties. This is due to the fact that what is subject to being pressed when the pressing is performed in a plurality of stages is different. Specifically, this is because the first press presses the first portion 41 of the cover member 40 alone, while the second press presses the non-IF corresponding portion 44 of the second portion 42 of the cover member 40 with the airbag cushion 30 inside. As a result, in the cover member 40 after pressing, the first portion 41 and the non-IF corresponding portion 44 of the second portion 42 are different in surface fiber state to such an extent that they can be visually and/or tactilely distinguished.

In the manufactured airbag device 10, the surface properties of the first portion 41 and the second connecting portion 43 of the second portion 42 are relatively different, while in the second portion 42, the second connecting portion 43 and the non-IF corresponding portion 44 have relatively similar surface properties. This is because the second connecting portion 43, like the non-IF corresponding portion 44, was not subjected to the first press, and during the second press, similar to the non-IF corresponding portion 44, makes direct contact with the mold 72 of the press device 73 and undergoes a thermosetting cycle.

The difference in surface properties between the first portion 41 and the second portion 42 also appears in physical measurement results, for example. Here, the second portion 42 after pressing has a higher amount of surface roughness than the first portion 41 after pressing. When compared by Ra (center line roughness: arithmetic average roughness), the surface roughness of the second portion 42 is greater than the surface roughness of the first portion 41. As an example, as can be seen in Table 1, which shows the Ra measurement results, the average value of the first portion 41 is calculated to be 0.0179, while the average value of the second portion 42 is calculated to be 0.0999. Of course, the second portion 42 is smoother than the pre-press value (0.2263).

TABLE 1

Ra Measurement Results

| | Measurement Points | Ra [mm] |
|---|---|---|
| Second portion 42 | Outer surface of the upper portion of the non-IF corresponding portion 44 | 0.0732 |
| | Inner surface of upper portion of non-IF corresponding portion 44 | 0.1163 |
| | Outer surface of the second connecting portion 43 | 0.0924 |
| | Inner surface of the second connecting portion 43 | 0.1176 |
| First portion 41 | Outer surface of the upper portion of the IF-corresponding portion 51 | 0.0269 |
| | Inner surface of the upper portion of the IF-corresponding portion 51 | 0.0185 |
| | Outer surface of the first connecting portion 52 | 0.0142 |
| | Inner surface of the first connecting portion 52 | 0.0118 |
| Cover member before pressing | | 0.2263 |

In addition, in the manufactured airbag device 10, the entirety of the cover member 40, in other words, the entire circumference of the cover member 40 surrounding the airbag cushion 30 has the same level of hardness (strength). For example, the cover member 40 covers the entire circumference of the airbag cushion 30 with the first portion 41 and the second portion 42.

The first portion 41 and the second portion 42 have a mutually similar hardness. For example, the Shore A hardness is 50 or more. This hardness is higher than the initial hardness (hardness at step S1 of FIG. 5) before the cover member 40 is subjected to pressing.

In the second portion 42, the hardness of the second connecting portion 43 and the non-IF corresponding portion 44 are relatively similar. This is because, similar to what was described above regarding surface properties, the second connecting portion 43 is not compressed during the second press, but is heated by the pressing device 73 and undergoes a thermosetting cycle.

According to the method of manufacturing the airbag device 10 of the present Embodiment described above, the first press is performed on the first portion 41 of the cover member 40 having the portion (IF-corresponding portion 51) including the position corresponding to the inflator 20, then the second press is performed on the portion (non-IF corresponding portion 44) including at least a part of the first non-pressed portion (second portion 42). Since the cover member 40 does not cover the airbag cushion 30 during the first press, the inflator 20 is not affected. As a result, the changes in properties of the cover member 40 during pressing (increased hardness, change in surface properties) can be applied to the first portion 41 including the IF-corresponding portion 51 of the cover member 40. In addition, during the second press, since the cover member 40 covers the airbag cushion 30, the non-IF corresponding portion 44 of the cover member 40 can be subjected to a change in properties (for example, an increase in hardness or change in surface properties) while compressing the entirety thereof into, for example, a three-dimensional shape and size. In particular, the inflator 20 is not affected even during the second press.

In this manner, since the pressing is performed in at least two stages considering the position of the inflator 20, it is possible to enable modularization avoiding affecting the inflator 20, while widely applying the changes in properties to the cover member 40 due to pressing (increase in hardness, change in surface properties) to the cover member 40. Therefore, in the manufactured modularized airbag device 10, the hardening amount of the entire cover member 40 is stabilized, and scattering is eliminated. This results in stabilization of deployment behavior and speed of the airbag cushion 30, leading to improvement in occupant protection performance.

In addition, in the manufactured modularized airbag device 10, the first portion 41 and the second portion 42 of the cover member 40 have relatively different surface properties. A person skilled in the art can confirm that the cover member 40 has undergone multiple stages of pressing when the condition of the fibers on the surface becomes visually and/or tactilely different.

The embodiment described above is for ease of understanding of the present invention and is not intended to be construed as limiting the present invention. Elements included in the embodiment, as well as arrangements, materials, conditions, shapes, sizes, and the like thereof, are not limited to those exemplified, but rather can be appropriately changed.

For example, as long as the portion where the second press is performed or has been performed is a portion including at least a part of the first non-pressed portion of the cover member 40, this is not limited to the above-mentioned portion (in other words, part of the first non-pressed portion or all of the non-IF corresponding portion 44). Some examples of this are illustrated in FIGS. 7A to G. Note that in FIGS. 7A to 7G, the hatched portion of the cover member 40 indicates the portion where the first press is performed (in other words, the first portion 41), and the white points of the cover member 40 indicate portions of the cover member 40 where the first press was not performed (first non-pressed portion).

Figure 7A:
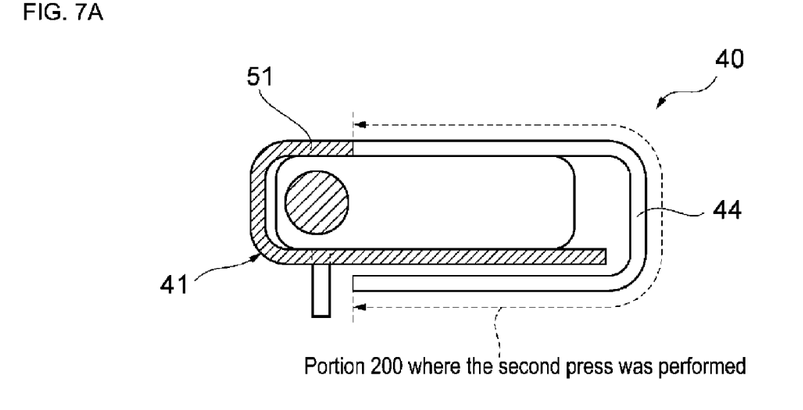
FIG. 7A is a diagram illustrating an example of a portion subjected to a second press in the manufacturing method of the airbag device according to the Embodiment.

As illustrated in FIG. 7A, the portion 200 on which the second press was performed may consist of all of the first non-pressed portion (all of the non-IF corresponding portion 44). In this case, the cover member 40 does not have the second connecting portion 43 described above, and the second press is performed on all remaining portions of the cover member 40 other than the first portion 41.

Figure 7B:
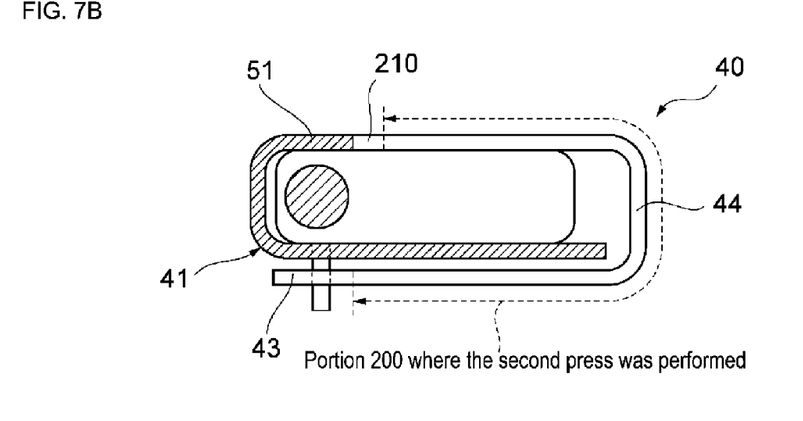
FIG. 7B is a diagram illustrating an example of a portion subjected to a second press in the manufacturing method of the airbag device according to the Embodiment.
Figure 7C:
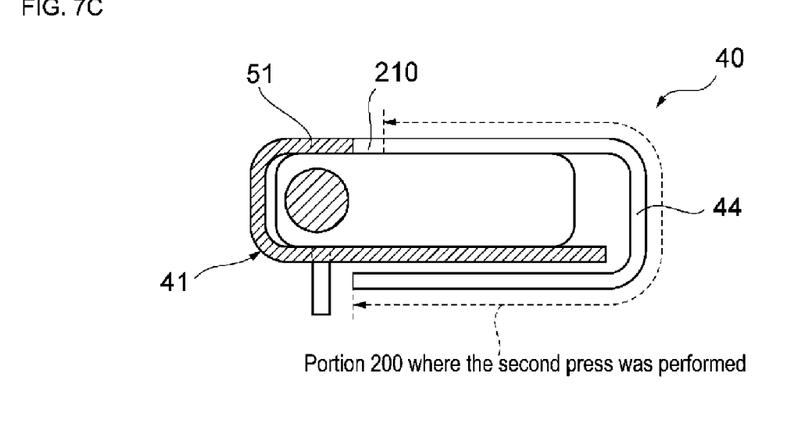
FIG. 7C is a diagram illustrating an example of a portion subjected to a second press in the manufacturing method of the airbag device according to the Embodiment.

As illustrated in FIGS. 7B and 7C, the portion 200 to which the second press was performed may include a portion of the first non-pressed portion (a portion of the non-IF corresponding portion 44). FIG. 7C illustrates an example in which the second connecting portion 43 is removed from FIG. 7B. In these cases, the second press is performed on a portion of the remaining portion of the cover member 40 excluding the first portion 41. A portion 210 where neither the first press nor the second press is performed exists between the portion 200 where the second press is performed and the first portion 41 where the first press is performed. The portion 210 is a part of the non-IF corresponding portion 44 and is connected to the IF-corresponding portion 51. It should be noted that the portion 210 may result from, for example, errors during the first press and/or the second press (dimensional errors at pressed points).

Figure 7D:
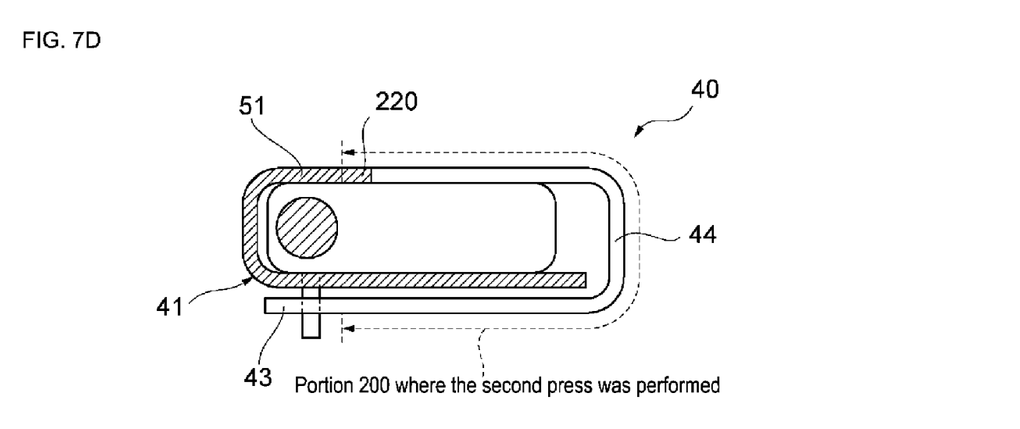
FIG. 7D is a diagram illustrating an example of a portion subjected to a second press in the manufacturing method of the airbag device according to the Embodiment.

As illustrated in FIG. 7D, the portion 200 subjected to the second press may include a part of the first non-pressed portion (the entirety of the non-IF corresponding portion 44) and the portion 220 that is a part of the first portion 41 leading to the first non-pressed portion. In this case, the portion 220 is the portion subjected to both the first press and the second press. The portion 220 is a portion outside the IF-corresponding portion 51.

Figure 7E:
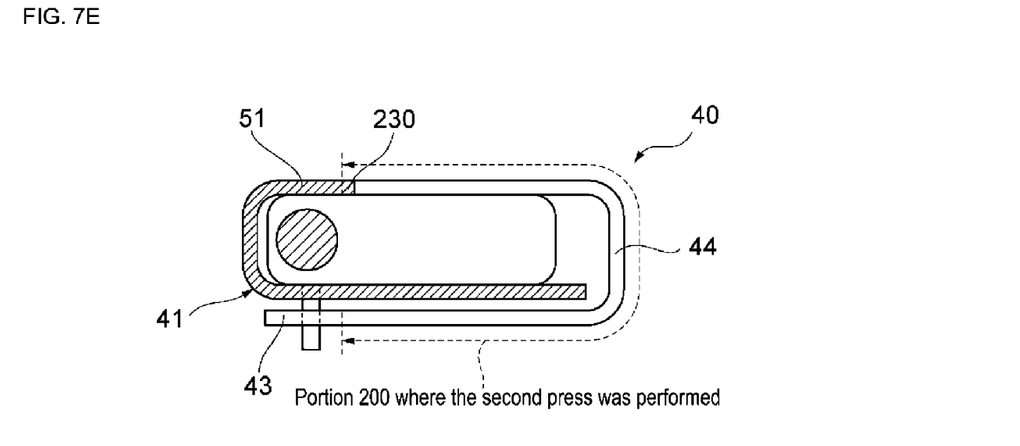
FIG. 7E is a diagram illustrating an example of a portion subjected to a second press in the manufacturing method of the airbag device according to the Embodiment.

As illustrated in FIG. 7E, the portion 200 subjected to the second press may include a part of the first non-pressed portion (the entirety of the non-IF corresponding portion 44) and the portion 230 that is a part of the first portion 41 leading to the first non-pressed portion. In this case, the portion 230 is the portion subjected to both the first press and the second press. The portion 230 is at least a part of the IF-corresponding portion 51. In this example, the portion 230 is the end part of the IF-corresponding portion 51.

Figure 7F:
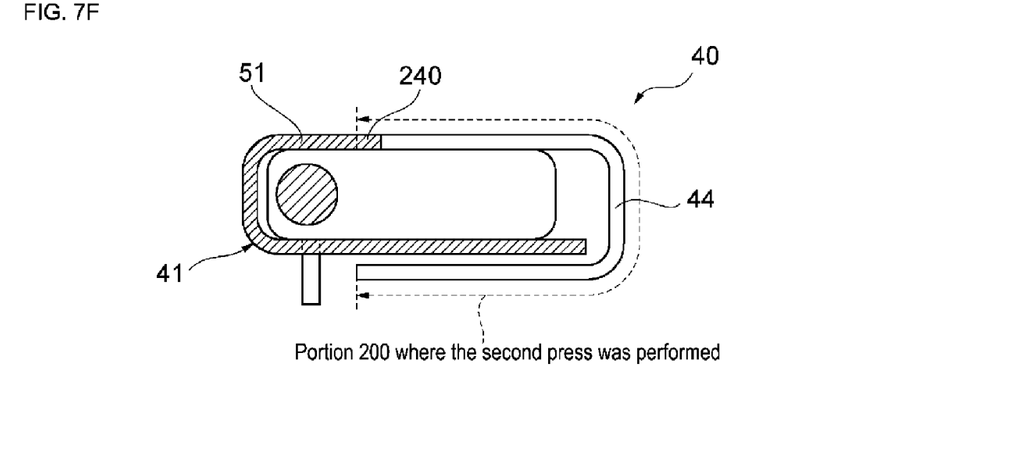
FIG. 7F is a diagram illustrating an example of a portion subjected to a second press in the manufacturing method of the airbag device according to the Embodiment.

FIG. 7F illustrates an example in which the second connecting portion 43 is removed from FIG. 7D. As illustrated in FIG. 7F, the portion 200 to which the second press was performed may include the entirety of the first non-pressed portion (the entirety of the non-IF corresponding portion 44) and a portion 240 that is a part of the first portion 41 leading to the first non-pressed portion. In this case, the portion 240 is the portion subjected to both the first press and the second press. The portion 240 is a portion outside the IF-corresponding portion 51.

Figure 7G:
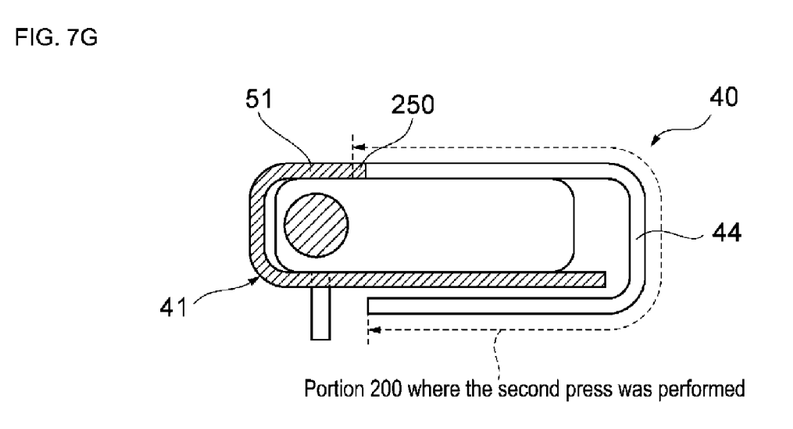
FIG. 7G is a diagram illustrating an example of a portion subjected to a second press in the manufacturing method of the airbag device according to the Embodiment.

FIG. 7G illustrates an example in which the second connecting portion 43 is removed from FIG. 7E. The portion 200 on which the second press was performed may include the entire first non-pressed portion (the entire non-IF corresponding portion 44) and a portion 250 that is a part of the first portion 41 leading to the first non-pressed portion. In this case, the portion 250 is the portion subjected to both the first press and the second press. The portion 250 is at least a part of the IF-corresponding portion 51. In this example, the portion 250 is the end part of the IF-corresponding portion 51.

Referring to the relationship with the IF-corresponding portion 51 for each example illustrated in FIGS. 7A to G, in FIGS. 7A to D and 7F, the entirety of the IF-corresponding portion 51 is included in the first portion 41 of the cover member 40. In other words, in FIGS. 7A to 7F, the IF-corresponding portion 51 is not entirely subjected to the second press, and is not included in the second portion 42 (for example, a portion including the second connecting portion 43 and the non-IF corresponding portion 44, or a portion including the non-IF corresponding portion 44). In this respect, the Embodiment illustrated in FIG. 4 is also the same.

On the other hand, in FIGS. 7E and 7G, not all but most of the portion of the IF-corresponding portion 51 is included in the first portion 41 of the cover member 40, while a part of the IF-corresponding portion 51 is included in the second portion 42 of the cover member 40. In other words, the portion 230 in FIG. 7E, which is a part of the IF-corresponding portion 51, and the portion 250 in FIG. 7G, are subjected to the second press, and included in the second portion 42 (for example, a portion including the second connecting portion 43 and the non-IF corresponding portion 44, or a portion including the non-IF corresponding portion 44).

Also, the molds in the pressing devices 63 and 73 may be those corresponding to the shape to be compressed by pressurization. Furthermore, although the pressing devices 63 and 73 apply heat and pressure to the cover member 40, they may also only apply pressure to the cover member 40. For example, depending on the material of the cover member 40 or the initial flexibility of the cover member 40, the three-dimensional shape can be easily obtained by pressing the cover member 40.

In addition, the airbag device 10 can be widely applied not only to side airbag devices but also to curtain airbags, knee airbags, and the like.

EXPLANATION OF CODES

10. Airbag device; 20. Inflator; 22. Stud bolt; 30. Airbag cushion; 32. Expandable capacity; 34. Opening; 36, 38. Side parts; 40. Cover member; 41. First portion; 42. Second portion; 43. Second connecting portion; 44. Non-IF-corresponding portion; 45, 47. Holes; 51. IF-corresponding portion; 52. First connecting portion; 61, 62. Molds; 63. Press device; 71, 72. Molds; 73. Press device; 75. Recess; 102. Vehicle seat; 104. Seatback; 106. Side door; 108. Vehicle seat; 110. Center console; 112. Seatback.

The invention claimed is:

1. A manufacturing method of an airbag device including a folded airbag cushion with at least a part of an inflator equipped therein, and a cover member covering the folded airbag cushion, the method comprising:
   performing a first press in a first state where the folded airbag cushion is not covered by the cover member on a first press portion of the cover member where the first press portion includes an inflator corresponding portion included in a position corresponding to the inflator within the folded airbag cushion;
   covering the folded airbag cushion with the cover member; and
   performing a second press in a state where the folded airbag cushion is covered by the cover member on a second press portion, the second press portion including at least a part of a first non-pressed portion of the cover member where the first press was not performed,
   wherein the first press of the inflator corresponding portion is performed without the folded airbag cushion and the cover member covers the folded airbag cushion after performing the first press.

2. The manufacturing method of the airbag device according to claim 1, wherein due to the first press and second press, the second press portion on which the second press was performed has different surface properties than a first press only portion on which only the first press was performed.

3. The manufacturing method of the airbag device according to claim 1, wherein due to the first press and second press, the second press portion on which the second press was performed has a higher amount of surface roughness compared to the a first press only portion on which only the first press was performed.

4. The manufacturing method of the airbag device according to claim 1, wherein the second press portion on which the second press was performed is made up of all or a part of the first non-pressed portion.

5. The manufacturing method of the airbag device according to claim 1, wherein the second press portion on which the second press was performed includes all or a part of the first non-pressed portion, and a connecting portion that is a part of the first press portion that connects to the first non-pressed portion.

6. The manufacturing method of the airbag device according to claim 5, wherein the connecting portion that connects to the first non-pressed portion is distinct from the inflator corresponding portion of the first press portion.

7. The manufacturing method of the airbag device according to claim 5, wherein the connecting portion connecting to the first non-pressed portion is at least a part of the inflator corresponding portion.

8. The manufacturing method of the airbag device according to claim 1, wherein the first press portion has a first connecting portion connecting to the inflator corresponding portion, and the first connecting portion overlaps with an inside of the second press portion to which the second press is performed when the second press is performed.

9. The manufacturing method of the airbag device according to claim 1, wherein the cover member is formed of a ductile material.

10. An airbag device manufactured with the method of claim 1, wherein:
surface properties of the first press portion and the second press portion are mutually different, and
out of the first press portion and second press portion, at least most of the inflator corresponding portion is included in the first press portion.

11. The airbag device according to claim 10, wherein compared to the first press portion, the second press portion has a higher amount of surface roughness.

12. The airbag device according to claim 10, wherein the inflator corresponding portion is configured by a portion with a substantially C-shaped cross-section that wraps around a side part of the folded airbag cushion.

13. The airbag device according to claim 12, wherein the second press portion is configured by a portion with a substantially C-shaped cross-section that wraps around an opposite side from the side part of the folded airbag cushion.

14. The airbag device according to claim 10, wherein the cover member is formed of a ductile material.

* * * * *